Sept. 15, 1970　　　　　　　N. J. FERRIER　　　　　　3,529,125
AUTOMATIC WELD TRACER WITH LATERAL ELECTRODE
POSITIONING FOR LAP JOINTS
Filed Jan. 24, 1969
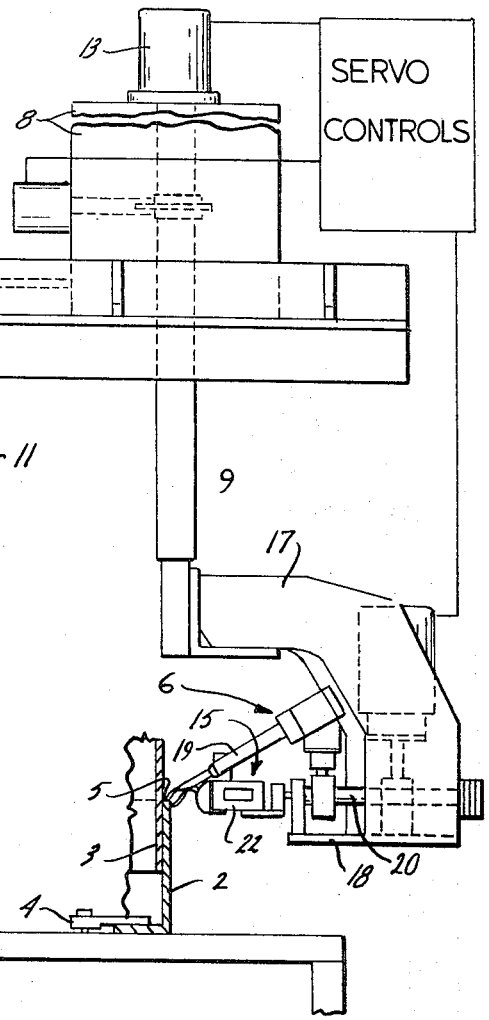
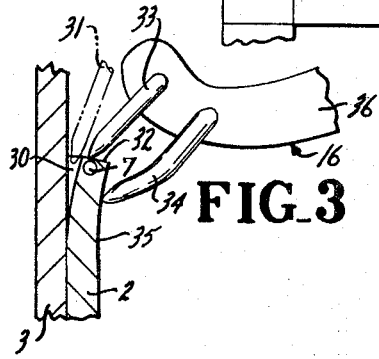
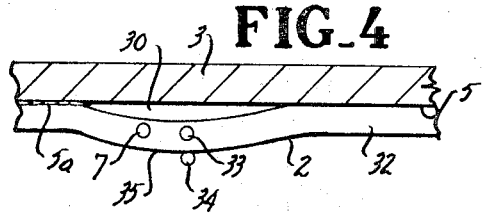
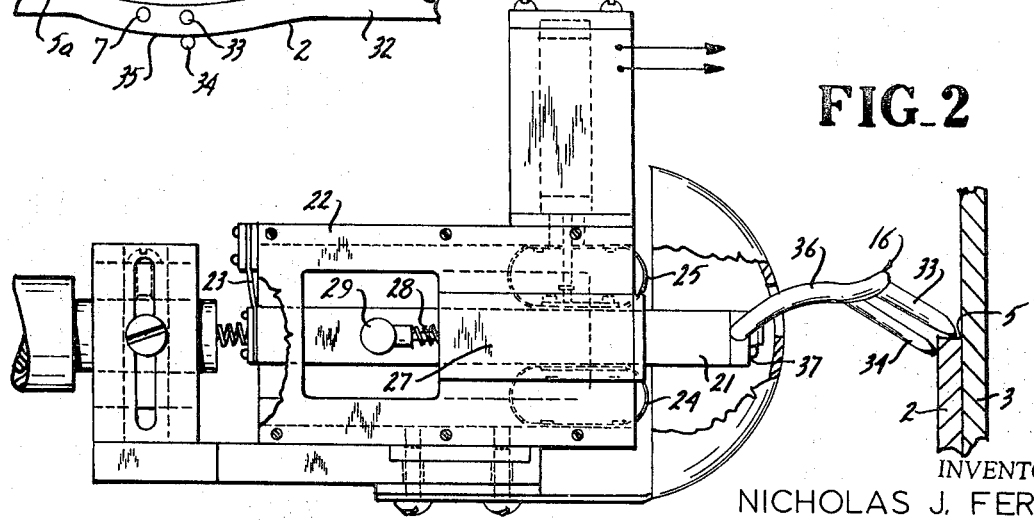
INVENTOR.
NICHOLAS J. FERRIER
BY
Andrus, Sceales, Starke & Sawall
Attorneys

United States Patent Office 3,529,125
Patented Sept. 15, 1970

3,529,125
AUTOMATIC WELD TRACER WITH LATERAL ELECTRODE POSITIONING FOR LAP JOINTS
Nicholas J. Ferrier, Menomonee Falls, Wis., assignor to A. O. Smith Corporation, Milwaukee, Wis., a corporation of New York
Filed Jan. 24, 1969, Ser. No. 793,861
Int. Cl. B23k 9/12
U.S. Cl. 219—125                           7 Claims

ABSTRACT OF THE DISCLOSURE

This disclosure includes a weld head driven along a weld lap joint of two overlapping plates. A floating probe unit has a first follower riding on the top of the first plate and is mounted for linear movement normal to the weld joint and for pivotal vertical movement. A pair of linear voltage differential transformers are mounted to the probe unit and the cores positioned in accordance with the weld joint. The output of the transformers locates the tip of a consumable electrode on the center of the top edge of the first plate. A lateral positioning follower is connected to the first follower and extends downwardly into engagement with the face of the first plate and positively prevents the first follower from moving in beyond the center of the plate. The electrode is thereby properly centered on the edge and prevented from missing the edge of the outer plate at a gap between the two plates.

---

This invention relates to a tool control tracer apparatus and particularly to locating a welding electrode in a lap joint for welding.

In arc welding and the like, automatic apparatus is often required to follow a contoured weld seam which may move in any one of a plurality of directions. Various systems have been suggested for controlling the movement of a weld electrode in accordance with the changing contour of a weld seam. The application of Bollinger et al. entitled "Automatic Tracer for Positioning Control" which was filed on the same date as this application and is assigned to the same assignee discloses a reliable and practical probe follower system for accurate positioning of a welding head and electrode. Generally, as disclosed in that application, the welding apparatus with the electrode is driven with a given horizontal speed. A probe follower rides on the upper edge of a lap joint and is urged into sliding engagement with the face of the adjacent weld member. The probe follower senses any vertical or horizontal displacement of the seam and provides respective voltages proportional thereto. The voltages are interconnected to directly drive servo motors, to reposition the weld nozzle and therefore the electrode in the corresponding directions. In addition, the weld nozzle may be tilted about a horizontal axis and about a vertical axis. Such a five axis coordinate system has been found to provide a highly desirable and very reliable welding apparatus for moving of a welding assembly in a pair of planes while maintaining the electrode in a predetermined desired position with respect to the depositing of the weld metal.

Such an apparatus has provided highly satisfactory welds. Where the parts to be welded are overlapped plate-like members defining a lap joint, however, the weld metal does not bridge gaps in the joint which are caused by deformation such as flower potting of the outer plate-like member defining the edge upon which the follower rests. Applicant discovered that the defects arose because the follower moves into the gap and thus generates a corrective signal as if the edge had dropped, even though it has not. The corrective signal of course correspondingly repositions the weld electrode such that it moves onto the inner plate-like member and the gap at the edge is not bridged with a resultant defective weld at that point.

The present invention is particularly directed to a floating type probe means having a double follower which accurately tracks and produces output signals to maintain the electrode in position to bridge such gaps.

The probe follower in accordance with invention includes a first member such as a pencil-like rod which rides on the top edge of the seam defined by a pair of overlapping plates. A second member is fixed to the first member and extends downwardly into engagement with the outer face of the adjacent plate. The probe follower is connected in the control circuit to position the electrode in both the vertical and the horizontal direction. The second member establishes a reference to locate the electrode with respect to the top edge of the outer plate, preferably midway, and insure that the electrode is properly located to bridge minor gaps at the joint.

The drawing furnished herewith illustrates the best mode presently contemplated by the inventor for carrying out the subject invention and disclose the above advantages and features as well as others which will be readily understood from the following description.

In the drawing:

FIG. 1 is an elevational view of a welding assembly constructed in accordance with the present invention;

FIG. 2 is an enlarged side elevational view of the probe follower unit shown in FIG. 1;

FIG. 3 is a simplified vertical section showing the movement of the follower unit shown in FIG. 2; and FIG. 4 is a diagrammatic top view of FIG. 3.

Referring to the drawings and particularly to FIG. 1, the present invention is illustrated in connection with an automatic arc welding apparatus including a supporting frame structure 1 within which a pair of overlapping metal plates 2 and 3 are disposed and secured in fixed relationship by a clamp structure 4. The overlapping metal plates 2 and 3 are clamped in a vertical position to define a weld lap joint seam 5 at the position of overlap which is to be provided with a continuous interconnecting weld 5a. In the illustrated embodiment of the invention, an arc welding head 6 is movably supported within the supporting frame structure 1 to follow the weld seam 5 and to direct a weld electrode 7 toward the seam and by applying a welding potential between the electrode 7 and the plates 2 and 3 establishing a welding arc which continuously deposits electrode metal onto the seam 5. The weld head 6 and in particular the tip of the weld electrode 7 may be provided with suitable controls for positioning along the three coordinated axes of the Cartesian coordinate system as well as angularly oriented about two of the axes.

The overlapping plates 2 and 3 are secured within the structure 1 with the seam 5 extending generally in a horizontal plane which is hereinafter defined or related to the X-coordinate axis direction of the Cartesian coordinate system.

Generally, the suporting structure 1 includes a vertical column 8 within which a vertical positioning square shaft of the vertical shaft 9 which defines the Y-way control or support for the weld head apparatus. The column 8 in addition is mounted by a Z-way carriage or support 10 which in turn is movable along an X-way support 11 to allow movement of the total assembly on the three coordinate axes with respect to the weld seam 5.

The column 8 is driven along the X-way by an X-axis drive motor 12 as shown in FIG. 1. The Y-axis drive motor 13 is mounted to the top of the column 8 and coupled to the vertical shaft 9 for positioning of the weld head 6 in the Y-direction. A Z-axis drive motor 14 is coupled to the column 8 through a suitable screw drive or the like for positioning of the column 8 and therefore the weld head 6 in the Z-axis direction along the support 10. In addition to the three coordinate drives, the weld head 6 and attached electrode 7 are adapted to be positioned about a first angle in the X–Y or vertical plane and a second angle in the X–Z plane by a suitable means such as referred to in the co-pending application of J. D. Bollinger et al.

The present invention is particularly directed to the controlled actuation of the Z-axis motor 14 in accordance with the output of a transducer 15 which includes a probe tip 16 following the seam 5.

More particularly, in the illustrated embodiment of the invention, an L-shaped mounting frame 17 is secured to the lower end of the shaft 9. The L-shaped mounting frame 17 extends laterally outwardly from the work with a depending leg extending downwardly and terminating in a supporting base or plate 18. The transducer 15 and the arc welding head 6 are secured to the mounting plate 18. Head 6 includes weld nozzle 19 through which the electrode 7 is fed to the seam 5. The nozzle 19 and transducer 15 are connected to and supported by a common support shaft 20 for a corresponding orientation with respect to seam 5.

Transducer 15 is connected to an L-shaped bracket 20a secured to the end of shaft 20 and mounted as more fully disclosed in the previously referred to Bollinger et al. application.

Referring particularly to FIG. 2, the transducer 15 includes a probe body portion 21 to which the probe tip 16 is attached. The probe body portion 21 is shown as a rectangular block of a suitable lightweight metal such as copper which is slidably mounted within a generally rectangular supporting frame or housing 22.

A cantilevered spring member in the form of a flat leaf spring 23 secures the rearward or outermost end of the body portion 21 to housing 22.

The forward end of the body portion 21 is supported by a pair of spring means 24 and 25 interconnected respectively to the top and bottom surfaces of the probe means and the adjacent housing. Each of the springs 24 and 25 is a similar spring metal band bent into a loop spring of a generally rectangular shape. The loop type construction permits the rectilinear movement of the probe body portion 21 in the horizontal plane while also permitting the vertical pivotal movement of the body portion 21 with the pivot point being defined by the cantilevered spring 23 and its attachment to the body portion 21. The rectilinear motion and the pivotal motion of the body portion 21 are similarly individually detected by a pair of linear voltage differential transformers 26 and 27 mounted to the top and side of the transducer 15. The transformers 26 and 27 are similarly constructed in accordance with well-known construction includes a fixed winding, not shown, to which suitable electrical input-output leads are connected. The output is controlled by the actual positioning of a core of which only the core 28 for the transformer 27 is shown for purposes of clearly disclosing the control along the Z-axis or direction.

A lightweight arm 29 is secured to the sidewall of the body portion 21 along the axis of movement and projects outwardly in front of the core 28 such that the core is positioned in accordance with the position of the probe unit 16 in the Z-direction.

The first plate 2 may not always follow precisely the immediate face of the first plate 2 as a result of manufacturing tolerances and the like. The plate 2 may therefore define a gap 30 in the Z-direction, as shown in FIGS. 3 and 4. If a single follower 31 rides on the seam top edge 32, as shown in phantom in FIGS. 3 and 4, encounters an opening or gap 31, it would tend to move into the gap 30 to vary the Y-axis positioning but maintain the Z-axis positioning in the coordinate servo system. This has been found to result in a locating of the electrode tip into the gap 30 with the weld metal deposited essentially on the inner rail or plate 2 without bridging the gap.

The present invention is particularly directed to positioning of core 28 in accordance with the rectilinear movement of the probe body portion 21 in the Z-direction to generate a corresponding output signal which is employed to reposition the weld head 6 and particularly the electrode 7 with respect to the weld seam 5.

The probe tip 16 in accordance with the present invention includes a pair of followers 33 and 34 riding respectively upon the top edge 32 and the adjacent outer face 35 of the outer plate 2.

In the illustrated embodiment of the invention, the probe tip 16 includes a generally curved mounting arm 36, the inner end of which is clamped or bolted to the body portion 21, as at 37. The mounting arm 36 curves upwardly and laterally toward the weld seam 5 with the outer end of the arm disposed somewhat above the weld seam 5.

The first follower 33 is a pointed pencil-like member which is welded, threaded or otherwise secured to the outermost end of the arm 36 and extends angularly downwardly toward the seam 5 with the outermost end terminating in a wear-resistant end riding on the upper edge 32 of the first outer plate 2. The follower 33 engages the plate 2 in alignment with the extension of the axis of the body portion 21 in the X coordinate direction and in the X–Z plane through the axis.

The second follower 34 is secured to arm 36 and extends downwardly below the level of the top edge 32 and terminates in sliding engagement with the outer faces of the first plate 2. The tip of the follower 34 engages the adjacent surface in alignment with the tip of follower 33, as shown in FIG. 4.

The probe tip 16 is preferably formed of copper or other material having excellent heat conducting qualities. The probe tip 16 is furthermore preferably clamped in heat exchange engagement to the body portion 21 such that the total probe assembly rapidly dissipates the heat resulting from the welding arc.

In the operation of the illustrated embodiment of the invention, the weld head 6 and the attached transducer 15 are aligned with the starting position of the lap point of the overlapping plates 2 and 3. The electrode 7 is energized through a suitable feed system and fed into the seam 5. Simultaneously, the X-axis drive motor is energized to move the total assembly along the weld seam 5 in the X-direction. The transducer 15 and particularly the probe followers 33 and 34 sense the movement of seam 5 in the Y-direction and in the Z-direction and provides the necessary signals for optimum positioning of the weld head 6 and attached electrode 7 in both the Y-direction and Z-direction.

The Z-direction is particularly controlled by the lateral position of the outer weld plate 2. If the plate 2 moves outwardly in the Z-direction or away from the weld head 6, the probe follower 34 moves outwardly under the action of the cantilever spring 23 and the forward springs 24 and 25. This, in turn, repositions the core 28 of the differential transformer 27 and generates an electrical signal which is immediately transmitted back to the servo system for the Z-axis drive motor 14 and causes it to move the column 8 to which the weld head 6 and transducer 15 are interconnected in the Z-direction to reposition the electrode tip 7. This movement does not effect any of the other component directions and in particular the other differential transformer 26.

If the weld plate 2 should be deformed inwardly with a resultant gap 30, the follower 34 is forced inwardly toward head 6 against the forces of springs 23, 24 and 25 to generate a corresponding repositioning signal such that the Z-axis drive motor 14 is energized to center the electrode 7 on the top edge. The electrode 7 is therefore maintained centered on the top edge 32 to produce a continuous weld joint 5a connecting the work members or plates 2 and 3.

The present invention provides a floating type support for the tracer which creates an optimum location of the electrode with respect to the top edge of a lap joint for insuring a continuous weld joint.

I claim:

1. A weld tracer apparatus for positioning a welding electrode with respect to a pair of overlapping and abutting plate-like metal members defining a weld seam at the edge of the first metal member, comprising a follower element positioned to ride against the face of the first metal member immediately below said edge, a second follower element positioned to ride on the edge, and signal means coupled to the follower elements to sense the lateral displacement of the edge by the first named follower element and generate a proportional correction signal for laterally positioning of the electrode and to sense the displacement of the edge by the second named follower element and generate a proportional signal for parallel positioning of the electrode.

2. The weld tracer apparatus of claim 1 wherein said second follower element is connected to said first follower element, and said signal means include first and second signal means coupled to sense ahe movement of only the corresponding follower element.

3. The tracer apparatus of claim 2 wherein said signal means includes a pair of differential transformer means mounted to respond to the corresponding movements of the follower elements in accordance with the respectively engaged surfaces.

4. The weld tracer apparatus of claim 2 having both follower elements connected to a body portion, spring means secured to said body portion and including a pivot support means and a linear support means conjointly supporting the body portion with said pivot support means accommodating movement of the body in the plane of movement of the second element and said linear support means accommodating movement in the plane of movement of the first element.

5. The weld tracer apparatus of claim 2 wherein said second follower element includes a tip adapted to ride on said edge and said first follower element is spaced in accordance with a preselected proportion of the thickness of the first member to slidably engage the face of the adjacent plate-like member and to locate the first follower element centrally of the edge and in spaced relation to the second plate-like member.

6. A weld tracer apparatus for positioning a welding electrode with respect to a pair of overlapping and abutting plate-like metal members defining a weld seam between the edge of the first metal member and the adjacent face of the abutting second metal member, comprising first sensor means connected to the electrode and positioned to ride against the face of the first member to sense the lateral position of the edge of the first metal member relative to said second metal member, control means responsive to said first sensor means to generate an electrical control signal and maintain the welding electrode in predetermined overlying lateral alignment to the edge of the first metal member, and second sensor means to detect the contour of the edge and having signal means to correspondingly position the electrode with respect to the contour of the edge.

7. The tracer apparatus of claim 6 wherein said control means maintains said electrode located essentially centrally of said edge.

References Cited
UNITED STATES PATENTS

| | | | |
|---|---|---|---|
| 2,288,032 | 6/1942 | Smith | 219—125 |
| 2,395,525 | 2/1946 | Wilkie et al. | 90—62 |
| 2,827,548 | 3/1958 | Griswold | 219—125 |
| 2,839,663 | 6/1958 | McCollom | 219—76 |
| 3,084,246 | 4/1963 | Rieppel et al. | 219—137 X |
| 3,122,970 | 3/1964 | Rhoades | 336—30 X |
| 3,171,012 | 2/1965 | Morehead | 219—124 |
| 3,199,056 | 8/1965 | Cameron | 336—30 X |
| 3,281,047 | 10/1966 | Weicht | 219—125 X |

JOSEPH V. TRUHE, Primary Examiner

L. A. SCHUTZMAN, Assistant Examiner

U.S. Cl. X.R.

90—62; 228—8